Patented July 22, 1952

2,604,477

UNITED STATES PATENT OFFICE 2,604,477

LEUCO SULFURIC ACID ESTERS OF TRI-ANTHRIMIDE CARBAZOLE DYESTUFFS AND METHOD FOR PRODUCING THE SAME

Samuel Coffey, David Alexander Whyte Fairweather, and Frank Hayhurst Slinger, Blackley, Manchester, England, assignors to Imperial Chemical Industries Limited, a corporation of Great Britain No Drawing. Application November 18, 1947, Serial No. 786,795. In Great Britain November 25, 1946

3 Claims. (Cl. 260—316)

This invention relates to a new dyestuff and in particular it relates to a process for the manufacture of a new leuco sulphuric ester derivative of 1:1′:5:1″ - trianthrimide-2:2′:6:2″-carbazole.

It has been proposed to make sulphuric esters of leuco derivatives of vat dyestuffs by treating the leuco derivative of the vat dyestuff with for example chlorosulphonic acid in the presence of a tertiary base for example pyridine or by treating the vat dyestuff itself in tertiary base suspension in the presence of a metal with sulphur trioxide or with a substance which can give rise to sulphur trioxide in the reaction mixture. Also in British specification No. 274,156 it was proposed to react the vat dyestuff in tertiary base suspension with the metal before the addition of sulphur trioxide, and a process was described for the manufacture of derivatives of vat dyestuffs by reacting a quaternary ammonium halide which may be obtained by the reaction between a tertiary organic base and an alkyl halide, in tertiary organic base suspension, with a metal, reacting the product with a vat dyestuff, and then reacting the resulting mixture with the product obtained by the interaction of a tertiary base with a reagent adapted to yield the sulphuric anhydride compound of the tertiary base, for example an alkyl chlorsulphonate, chlorsulphonic acid, oleum or sulphur trioxide. Pyridine and dimethylaniline were mentioned as examples of bases which could be used in the process.

It is known however that leuco sulphuric esters obtained by hitherto known processes from vat dyestuffs of the anthrimide carbazoles series are in general unsuitable for dyeing and printing since the shades obtained are dull and weak, have poor fastness properties and are different in hue from those obtained by the normal vat dyeing processes with the parent anthrimide carbazole.

We have found however that the above-mentioned trianthrimide carbazole, the leuco sulphuric ester derivative of which has not hitherto been satisfactorily described can be satisfactorily converted into a leuco sulphuric ester derivative when instead of using pyridine or other tertiary base in the above processes there is used an organic amide as hereinafter defined and we have further found that the leuco sulphuric ester so obtained is suitable for use in dyeing and printing and gives shades similar in properties to those obtained with the parent vat dyestuff by the normal vat dyeing process.

According to our invention therefore we provide a process for the manufacture of the new leuco sulphuric ester derivative of 1:1′:5:1″-trianthrimide-2:2′:6:2″-carbazole characterised in that the formation of the leuco sulphuric ester is carried out in the presence of an organic amide in which the hydrogen atoms attached to the amide nitrogen atom have been replaced by hydrocarbon radicles or substituted hydrocarbon radicles.

As examples of suitable amides for use in the reaction there may be mentioned amides derived from carboxylic acids, for example dimethylformamide, diethylformamide, dimethylacetamide, tetramethylurea and amides derived from sulphonic acids, for example N:N-diethyl-p-toluenesulphonamide. Diluents such as for example acetone and acetonitrile may also be added to the reaction mixture.

The formation of the leuco sulphuric ester may be carried out by treating the carbazole in the presence of the organic amide and a metal for example zinc, copper and iron with sulphur trioxide or with the addition compound of sulphur trioxide and an organic amide or tertiary base or with any known substance for forming sulphuric esters from vat dyestuffs in the presence of metals or from leuco compounds or metal salts thereof or complex compounds comprising the metal salts thereof. By a known substance we mean a substance actually used for this purpose or whose use is disclosed in the literature on the subject.

Alternatively instead of the carbazole itself and a metal there may be used a metal salt of the corresponding leuco compound. In general it is preferred to use the metal salt of the corresponding leuco compound or the complex compound comprising the metal salt of the corresponding leuco compound which may be made for example by reacting the parent vat dyestuff with a metal, for example zinc, in the presence of an organic amide as hereinbefore defined and preferably in the presence of a small quantity of a salt for example potassium methyl sulphate.

The leuco sulphuric ester salt so obtained may if desired be converted into a dry powder by any of the methods hitherto known for converting salts of leuco sulphuric esters to dry powders, and it may be applied to textile materials by dyeing, printing or padding processes.

The invention is illustrated but not limited by the following examples in which the parts are by weight.

Example 1

6.46 parts of 1:1':5:1" - trianthrimide-2:2':6:2"-carbazole which may be made by ring closing 1:1'-5:1"-trianthrimide is added, in a fine state of division, to a vigorously stirred mixture of 50 parts of dimethyl formamide, 6 parts of zinc dust and 0.6 part of potassium ethyl sulphate. A current of nitrogen is passed through the reaction vessel and the mixture is stirred for ½-hour at 20° C. The mixture is then cooled in an ice bath and the product obtained by reacting together 23.5 parts of methylchlorosulphonate and 35 parts of dimethylformamide is added. The colour of the reaction mixture changes from red-brown to yellow. The mixture is stirred for a further ½ hour and then poured into an excess of 5% sodium carbonate solution. The precipitated zinc carbonate is removed by filtration. Dimethylformamide is then removed by vacuum distillation and the product is salted out from the aqueous solution. The product is then filtered off, washed with an aqueous solution of sodium carbonate and sodium chloride, mixed with 3.5 parts of dextrin and dried in vacuo.

The product can be applied to fabrics in the usual manner and gives yellow shades of good fastness.

Example 2

6.46 parts of 1:1':5:1" - trianthrimide-2:2':6:2"-carbazole is added to a vigorously stirred mixture of 30 parts of dimethylformamide, 6 parts of zinc dust and 0.6 part of sodium β-naphthol sulphonate. Nitrogen is passed through the vessel and the mixture is stirred for 1 hour at 0° C. The resulting red-brown solution is added to the product obtained by reacting together 23.5 parts of methyl chlorosulphonate and 35 parts of dimethylformamide which is stirred in an icebath during the addition. The mixture is stirred for a further ½ hour and the product is then isolated as described in Example 1.

Example 3

3.23 parts of 1:1':5:1" - trianthrimide-2:2':6:2"-carbazole, in a fine state of division, is added to a vigorously stirred mixture of 10 parts of diethylformamide, 5 parts of acetonitrile, 3 parts of zinc dust and 0.6 part of methyltriethylammonium chloride. The mixture is stirred under nitrogen at 25° C. for ½ hour. 7 parts of sulphur trioxide in the form of its addition compound with diethylformamide is then added at 0° C. The mixture is stirred for a further ½ hour and the product is then isolated in the manner described in Example 1.

We claim:

1. The new leuco sulphuric ester dyestuff which in the form of its sodium salt is represented by the formula:

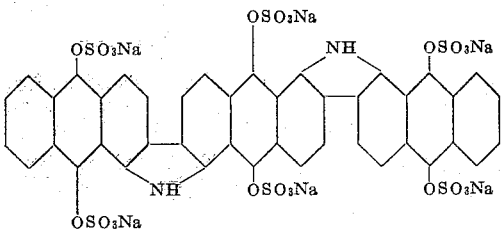

2. A process for the production of the leuco sulfuric ester dyestuff of 1:1':5:1:1"-trianthrimide-2:2':6:2"-carbazole characterized in that the formation of the leuco sulfuric ester is carried out in the presence of a non-vattable compound selected from the group consisting of amides of carboxylic and sulphonic acids having the formula

wherein A represents the acid radical of the amide and R represents a lower alkyl radical.

3. A process as claimed in claim 2, wherein the amide is dimethylformamide.

SAMUEL COFFEY.
DAVID ALEXANDER WHYTE FAIRWEATHER.
FRANK HAYHURST SLINGER.

REFERENCES CITED

The following references are of record in the file of this patent:

UNITED STATES PATENTS

| Number | Name | Date |
|---|---|---|
| 999,798 | Kalischer | Aug. 8, 1911 |
| 1,974,866 | Hauser et al. | Sept. 25, 1934 |
| 2,026,150 | Utzinger et al. | Dec. 31, 1935 |
| 2,359,864 | Linch | Oct. 10, 1944 |
| 2,403,226 | Lecher et al. | July 2, 1946 |